United States Patent Office.

CARL DUISBERG, OF ELBERFELD, GERMANY, ASSIGNOR TO THE FARBENFABRIKEN, VORMALS FR. BAYER & CO., OF SAME PLACE.

RED DYE AND PROCESS OF MAKING THE SAME.

SPECIFICATION forming part of Letters Patent No. 481,934, dated September 6, 1892.

Application filed July 16, 1891. Serial No. 399,696. (Specimens.) Patented in Germany November 19, 1885, No. 38,802; in England November 24, 1885, No. 14,424; in France December 19, 1885, No. 173,042; in Austria-Hungary May 7, 1886, No. 2,432 and No. 2,587, and in Italy May 26, 1886, No. 19,967.

*To all whom it may concern:*

Be it known that I, CARL DUISBERG, doctor of philosophy, (assignor to the FARBENFABRIKEN, VORMALS FR. BAYER & CO.,) a subject of the Emperor of Germany, residing at Elberfeld, Germany, have invented a new and useful Improvement in the Manufacture of a Red Direct-Dyeing Coloring-Matter, (for which the above-mentioned FARBENFABRIKEN has already obtained Letters Patent in Germany, No. 38,802, dated November 19, 1885; in France, No. 173,042, dated December 19, 1885; in England, No. 14,424, dated November 24, 1885; in Austria-Hungary, No. 2,432, and No. 2,587 dated May 7, 1886, and in Italy, No. 19,967, dated May 26, 1886,) of which I give in the following a clear and exact description.

My invention relates to the manufacture of a red direct-dyeing coloring-matter by combining one molecular proportion of tetrazodiphenol ether with two molecular proportions of alpha-naphthylamine monosulphonic acid.

In carrying out my process practically I proceed as follows: 24.4 kilos of diamidodiphenol dimethyl ether are dissolved in about three hundred and seventy-five liters of water and fifty kilos of muriatic acid. This solution cooled by ice is then slowly mixed with a watery solution of fourteen kilos of sodium nitrite, the production of the tetrazochloride being immediately complete. The thus-obtained clear tetrazo solution is thereupon allowed to flow slowly into a watery solution of the soda salt of about fifty kilos of the alpha-naphthylamine alpha-monosulphonic acid, (naphthionic acid.) By the addition of sodium acetate a dark precipitate separates, which after standing for some days under continuous stirring and repeatedly warming forms the new dye-stuff. On addition of carbonate of soda or soda-lye the soda salt of the dyestuff forms, which after having been isolated, filtered off, and dried is the new coloring-matter of the formula:

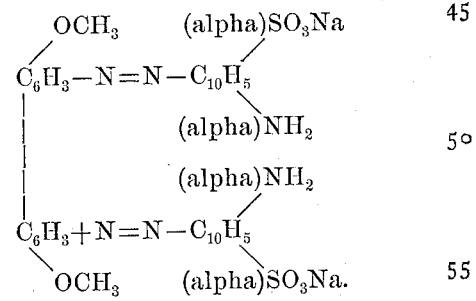

It forms a dark brown amorphous powder easily soluble in water with bluish-red color. By concentrated sulphuric acid it is dissolved with pure deep-blue color. On addition of water to such a sulphuric-acid solution dark-blue flakes separate and the fluid becomes totally colorless. The product in its watery solution is fast against alkaline, but is instantly altered by the addition of mineral acids, a dark-blue precipitate being separated.

This coloring-matter differs from the coloring-matter patented to me February 8, 1887, No. 357,274, as follows: The said previously-patented coloring-matter forms on reduction diamidodiphenyl ether with diamidonaphthaline sulphonic acid. If this latter compound is combined with phenanthrenequinone a compound results which is soluble in concentrated sulphuric acid with a magenta-red color. If the product of the present specification is treated in the same way the diamidodiphenyl ether and a different diamidonaphthaline sulphonic acid are formed. When the latter compound is combined with phenanthrenequinone, a product is obtained which dissolves in sulphuric acid with a blue-violet color.

My new dye-stuff is capable of dyeing unmordanted cotton in an alkaline soap bath in bluish-red shades.

As variations in the proportions necessary for the practical conditions required are admissible, I do not limit myself to the proportions stated.

Having thus described my invention and in what manner it is to be carried out, that which I claim as new, and desire to secure by Letters Patent, is—

1. The dye-stuff hereinbefore described, which has the formula:

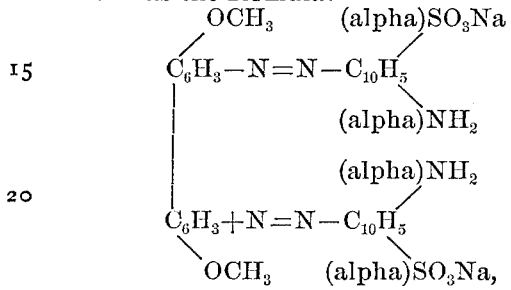

and is obtained by combining one molecular proportion of tetrazodiphenol ether with two molecular proportions of alpha-napthylamine monosulpho-acid and which forms in dried state a dark-brown amorphous powder that easily dissolves in water with bluish-red color and which is dissolved by concentrated sulphuric acid to a deep-blue liquid from out of which by the addition of water flakes of the same color are separated, while the supernatent fluid becomes colorless, and unmordanted cotton is dyed by it in a soap-bath magnificently bluish red.

2. The process for the production of a new substantive tetrazo dye-stuff by combining one molecular proportion of the tetrazo compound of dianisidine with molecular proportions of alpha-naphthylamine alpha-monosulphonic acid, (naphthionic acid.)

CARL DUISBERG.

Witnesses:
WM. DIESTEL,
HUGO BOEDELINGHAM.